(12) United States Patent
He et al.

(10) Patent No.: US 6,904,058 B2
(45) Date of Patent: Jun. 7, 2005

(54) TRANSMITTING DATA OVER A GENERAL PACKET RADIO SERVICE WIRELESS NETWORK

(75) Inventors: Liang He, Shanghai (CN); Cheng Zhang, Shanghai (CN); Song Cui, Shanghai (CN)

(73) Assignee: Intel Corporation, Santa Clara, CA (US)

(*) Notice: Subject to any disclaimer, the term of this patent is extended or adjusted under 35 U.S.C. 154(b) by 220 days.

(21) Appl. No.: 10/251,269

(22) Filed: Sep. 20, 2002

(65) Prior Publication Data

US 2004/0057456 A1 Mar. 25, 2004

(51) Int. Cl.[7] .................................... H04J 3/18
(52) U.S. Cl. ................ 370/477; 370/465; 370/468
(58) Field of Search ............................. 370/329, 468, 370/470, 471, 477, 395.21, 395.52, 465; 714/748, 749

(56) References Cited

U.S. PATENT DOCUMENTS

2001/0027490 A1 * 10/2001 Fodor et al. ............... 709/238
2002/0032800 A1 * 3/2002 Puuskari et al. ........... 709/246

FOREIGN PATENT DOCUMENTS

| WO | WO 99/05828 | * | 2/1999 | .......... H04Q/7/22 |
| WO | WO 99/48310 | * | 9/1999 | .......... H04L/12/56 |
| WO | WO 00/10357 | * | 2/2000 | .......... H04L/12/56 |

OTHER PUBLICATIONS

Christian Bettstetter et al., "GSM Phase 2+ General Packet Radio Service GPRS: Architecture, Protocols, and Air Interface," 1999 IEEE Communications Surveys, vol. 2, No. 3.

* cited by examiner

Primary Examiner—Wellington Chin
Assistant Examiner—Mark A Mais
(74) Attorney, Agent, or Firm—Trop, Pruner & Hu, P.C.

(57) ABSTRACT

In a communication system, a subscriber unit includes a storage device storing an application program to determine for transmission a current reserved bandwidth and a transmission parameter based on a quality of based on a quality of service profile, and an adapter to communicate data over a wireless network (e.g., a general packet radio service network) that supports a service, satisfying a reliability requirement for the service. The adapter may dynamically adjust the transmission parameter for the transmission before retransmitting one or more packets of data, e.g., at a rate and retransmission times commensurate with the current reserved bandwidth, and the reliability requirement in addition to the a current quality of service profile, ensuring a service level which otherwise cannot be provided by an infrastructure negotiated quality of service, especially in relatively shorter flows of data.

30 Claims, 5 Drawing Sheets

TRANSMITTING DATA OVER A GENERAL PACKET RADIO SERVICE WIRELESS NETWORK

BACKGROUND

This invention relates generally to content transmission over networks, and more particularly to transmitting data for services over a general packet radio service wireless network.

A service may involve transmission or exchange of information, in the form of packets of data over a communication network, between a service provider and a subscriber unit, cooperatively communicating based on a network protocol, such as a Transmission Control Protocol/Internet Protocol (TCP/IP) stack. In a network protocol stack, among other layers, a transport layer may be responsible for reliably transferring data between two endpoints using source and destination addresses. Although many factors including available bandwidth determine the transmission or flow of data associated with a service, a network may render different quality of services or class of service agreements for several users in myriad applications. Different user applications may transfer data using a quality of service (QoS) that may be negotiated based on available general packet radio service (GPRS) network resources.

In some situations, however, the negotiated QoS alone may not meet one or more requirements of user or upper layer applications. For example, an upper layer application of the TCP/IP network protocol stack, which requires the packet loss rate less than 0.001, cannot be satisfied with a service reliability class of the general packet radio service in which the packet loss rate of 0.01 is guaranteed. In some services, short transfers of data result in idle connections that may introduce latency, making the TCP/IP network protocol stack even more unsuitable in the delivery of short flows of data. Therefore, a gap exists between an application requirement for providing a service and the negotiated QoS.

Thus, there is a continuing need for better ways to transmit data for services over a general packet radio service wireless network.

DETAILED DESCRIPTION

Figure 1:
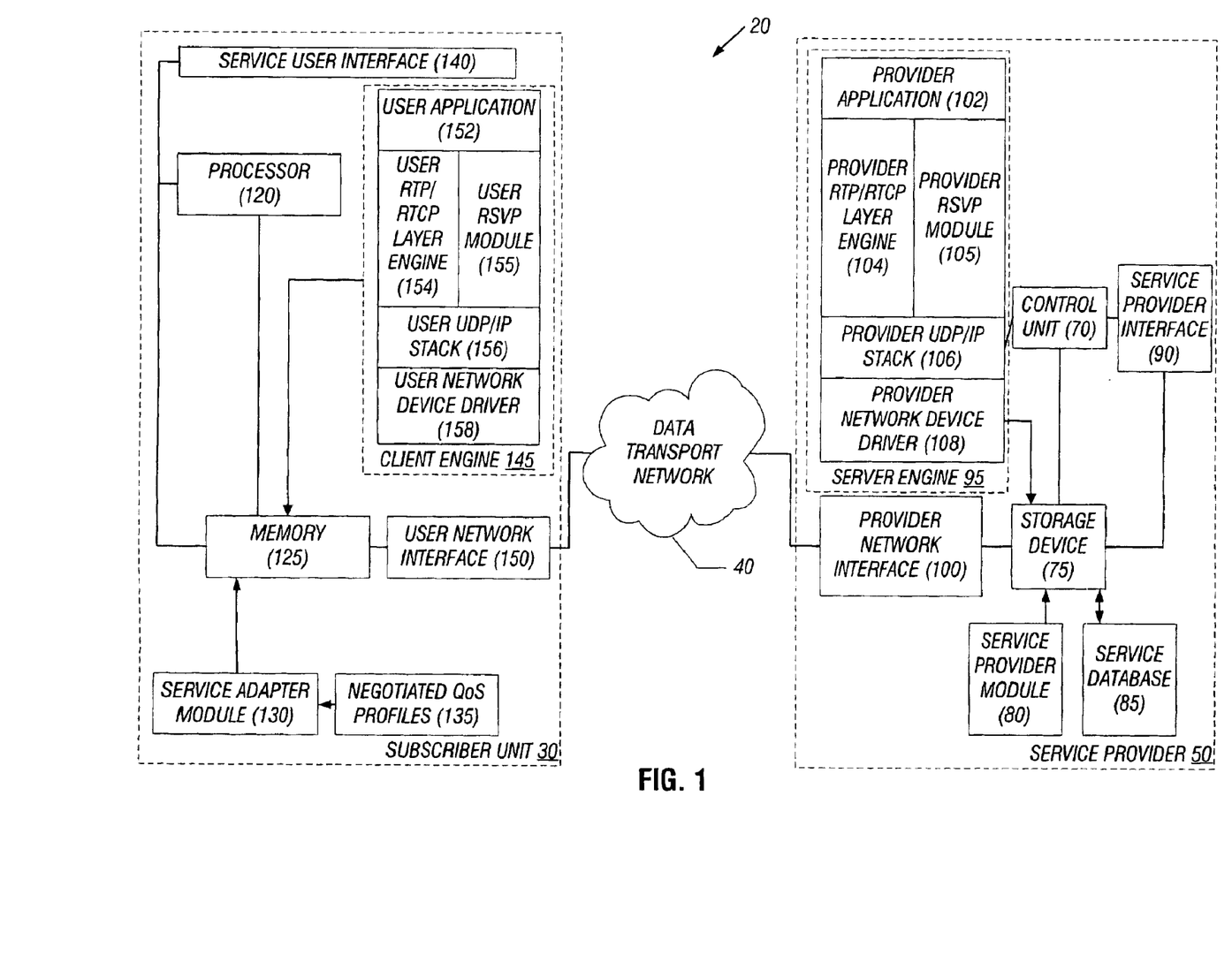
FIG. 1 is a schematic depiction of a communication system that provides transmission of data for a service over a data transport network consistent with one embodiment of the present invention.

A communication system 20, shown in FIG. 1, includes a subscriber unit 30 capable of subscribing to a service supported by a data transport network 40 in accordance with one embodiment of the present invention. The communication system 20 further includes a service provider 50 that may render at least one service to the subscriber unit 30 over the data transport network 40. A host of services including telecommunication services may be provided in one embodiment. The subscriber unit 30 and the service provider 50 may be physically located at different locations, however, both may cooperatively communicate using the data transport network 40, exchanging communications associated with the service. Although, a client-server architecture is illustrated for the communication system 20, other suitable architectures, such as a distributed architecture may be deployed in some embodiments of the present invention.

In some embodiments, one or more network or service operators may offer their customers, for example, a bearer service, which provides a transport mechanism capable of exchanging information over a bearer network, i.e., the data transport network 40. The service requirements that transmission of data may meet while providing a bearer service on the data transport network 40 may include an allocation of certain bandwidth. For example, various services and their users may indicate a specific bandwidth demand on the data transport network 40. However, end user requirements may determine the service parameters, such as a quality of service (QoS) while communicating data for a service user or subscriber between the subscriber unit 30 and the service provider 50 over the data transport network 40.

As one example, increasing number of services and service operators create a relatively large demand for bandwidth, such as during the transmission of packet-based data over a general packet radio service (GPRS). Moreover, the information flow of data traffic may display burstiness between a highest and an average data traffic values. The data exchange between clients (e.g., personal digital assistants (PDAs) and mobile phones) and a server providing a service may be inefficient because the data may be transferred in short transfers which may be spaced out by long idle durations. Such short transfers and idle durations may introduce undesired latency, making delivery of short flows of data on the data transport network 40 unsuitable.

Using a relatively more reliable, fast end-to-end retransmission and a resource reservation protocol (RSVP) based quality of service (QoS) negotiation, a packet-switched bearer service may support short flows of data with a desired quality of service over the data transport network 40 in one embodiment. Consistent with one embodiment, for the purposes of providing data delivery service over GPRS wireless network (GPRS, defined by European Telecommunications Institute (ETSI), is a kind of wireless network infrastructure), transport and control (a real-time transport protocol (RTP), a real-time transport control protocol (RTCP)) and reservation protocols defined in RFC 1889 and RFC 2205 specifications may be deployed. Both the RFC 1889 and RFC 2205 specifications are set forth by Internet Engineering Task Force (IETF) Audio/Video Transport Working Group in specifications entitled "RTP: A Transport Protocol for Real-Time Applications, Internet Official Protocol Standards, STD 1," RFC 1889, published in January 1996 and "Resource ReSerVation Protocol (RSVP)—Version 1 Functional Specification, Internet Official Protocol Standards, STD 1," RFC 2205, published in September 1997.

Over the data transport network 40, which in one embodiment may be a general packet radio service (GPRS) wireless network, a service subscriber using the subscriber unit 30 may communicate with the service provider 50 to exchange media content including voice, video and/or data at a rate that matches a transmission metric, such as reserved bandwidth during transmission in one embodiment. The reserved bandwidth for the transmission may be determined based on a quality of service profile in one embodiment. While communicating one or more packets of data over the data transport network 40 within the reserved bandwidth, at least one transmission parameter for the transmission may be dynamically adjusted, satisfying a service requirement in addition to the quality of service profile. For example, transmission rate and transmission times may be dynamically determined for the packets of data by current network conditions of the data transport network 40 in one embodiment.

Essentially, a service characteristic, such as a quality of service (QoS) indicative of at least one of a desired service level, reliability and class may be received in a quality of service (QoS) profile at the subscriber unit 30. For the purposes of transmitting data, the reserved bandwidth may be determined from a QoS profile negotiation between a service subscriber and the data transport network 40 in one embodiment of the present invention. During the transmission, for example, one or more packets of data may be adaptively communicated over the data transport network 40, matching the rate of transmission with the reserved bandwidth.

For provisioning a service, the service provider 50 comprises a control unit 70 coupled to a storage device 75 that stores a service provider module 80 with an associated service database 85 according to one embodiment of the present invention. The service provider module 80 may be executed either automatically by the control unit 70 to operate the service provider 50, or alternatively in response to user inputs entered at a service provider interface 90. The service database 85 may maintain and/or track the types of services available or provided by the service provider 50 in addition to storing information concerning one or more end users who may be registered in the service database 85, availing a particular service.

In one embodiment, the service provider 50 includes a server engine 95 that enables communications with the subscriber unit 30 through a provider network interface 100. The provider network interface 100 may be any one of conventional network interface cards (NICs) in one embodiment.

Consistent with one embodiment, the server engine 95 includes a provider application 102 to cooperatively interact with a counterpart located at the subscriber unit 30. For transferring voice, video, and/or data pertaining to a particular service, the server engine 95 may use a protocol stack including a provider real-time transport protocol (RTP)/a real-time transport control protocol (RTCP) layer engine 104. The RTP/RTCP layer engine 104 and a provider resource reservation protocol (RSVP) 105 may use a transportation service provided by a combination of user datagram protocol (UDP) and an Internet protocol (IP) provider stack 106 in one embodiment. While the RTCP provides a reception feedback to indicate to a data sender which RTP packets are correctly received, the RSVP is responsible for an end-to-end QoS profile negotiation between a service subscriber and a GPRS network for each session, as an example. A provider network device driver 108 may further be provided for the server engine 95 to controllably adapt the provider network interface 100, handling transmission and reception of voice, video and/or data over the data transport network 40. Any unacknowledged packets of data may be immediately retransmitted based on an automatically generated RTCP feedback, which indicates the sequence number of unacknowledged packets in some embodiments.

To use a service, the subscriber unit 30 includes a processor 120 and a memory 125 storing a service adapter module 130 to which one or more quality of service (QoS) profiles 135 that may be dynamically negotiated are provided in one embodiment of the present invention. Using the service adapter module 130, the processor 120 may operate the subscriber unit 30 within a communication or service session according to a currently negotiated quality of service profile 135 for that service session. The subscriber unit 30 further comprises a service user interface 140 to interactively receive inputs and/or present outputs in one embodiment of the present invention. Besides the service user interface 140, the subscriber unit 30 may further include a client engine 145 to cooperatively interface with the server engine 95 located at the service provider 50. For example, both the client engine 145 and the server engine 95 may enable communications in response to an activation of a communication or service session associated with a service. A user application 152 may cooperatively communicate with the provider application 102 according to one operation of the present invention.

From a negotiated quality of service profile 135, at the subscriber unit 30, the service adapter module 130 may determine for transmission a reserved bandwidth that is to be made available in a particular communication or service session. To transfer one or more packets of data to the service provider 50, the user application 152 may derive a rate of transmission of the packets of data. Thereafter, during the transmission, the packets of data may be communicated over the data transport network 40 at the rate that matches the reserved bandwidth. The service adapter module 130 may determine packet transmission times and a bit rate of transmission based on the reserved bandwidth, a reliability class indicated in the currently negotiated QoS profile 135, and a predefined service reliability parameter for the user application 152.

Like the server engine 95, the client engine 145 may include a user RTP/RTCP layer engine 154 and a user RSVP module 155. While the RTCP provides a reception feedback to indicate to a data sender which RTP packets are correctly received, the RSVP is responsible for an end-to-end QoS profile negotiation between a service subscriber and a GPRS network for each session, as an example. A combination of user datagram protocol (UDP) and an Internet protocol (IP) user stack 156 may provide a transportation service to the user RTP/RTCP layer engine 154 and the user RSVP module 155 in one embodiment. While interfacing with the data transport network 40, a user network interface 150 may be controlled by a user network device driver 158 in some embodiments of the present invention. In one embodiment, the user network interface 150 may be any one of conventional modulator and demodulators (MODEMs). As another example, a wireless network interface capable of wirelessly communicating with the data transport network 40 may be provided in some embodiments without departing from the spirit of the present invention.

An end-to-end QoS profile negotiation, bandwidth reservation in network infrastructure or establishment may be accomplished by the RSVP and QoS signaling available with GPRS, in one case. Regardless, the dynamically negotiated quality of service profiles 135 or any updates thereof may be communicated to the service database 85 in the service provider 50 in some situations. Based on the resources available to the service provider 50 (e.g., depending upon a network operator in one embodiment), the service provider module 80 may enable a service to the subscriber unit 30 over the data transport network 40. Using the service adapter module 130, the user data transportation service may be adapted to at least meet one or more requirements of the user application 152.

In doing so, the subscriber unit 30 may negotiate with the data transport network 40 infrastructure for the QoS reservation establishment, tracking a service criterion for the service against a quality of service profile 135. In one embodiment, the service criterion may indicate one or more requirements of the user application 152. To meet or exceed such requirements of the user application 152, the service adapter module 130 may adapt the rate of the transmission of the packets of data and packet transmission times based on the service criterion and a current QoS profile in one embodiment of the present invention.

To transfer the data packets, user data are encapsulated by the user RTP layer engine 154 (i.e., the sequence number of RTP packets is assigned uniquely, as one example) and the user UDP/IP stack 156 one after another, before being sent to the service provider 50 as IP packets by the service subscriber unit 30. On arrival of these IP packets, the service provider 50 extracts RTP sequence number and the user data in a reverse order. At the same time, a RTCP receipt indication, in which the sequence number of RTP packets may be specified may be sent to the subscriber unit 30 by the service provider 50 to acknowledge the correct reception of corresponding RTP packets. Furthermore, a buffer may be allocated to store each outgoing but unacknowledged packets at the service subscriber unit 30.

Specifically, in response to the receipt indication, any unacknowledged packets of data may be identified at the subscriber unit 30. The stored but unacknowledged packets of data may be immediately retransmitted from the subscriber unit 30 to the service provider 50 after a subscriber sends out all the packets and no new packets are generated, significantly improving the reliability and speed of the transmission, meeting the requirements of the user application 152 according to one embodiment of the present invention. However, the stored packets cannot be freed until they are acknowledged or the service subscriber unit 30 has used up all the retransmission opportunities, in one embodiment.

Figure 2:
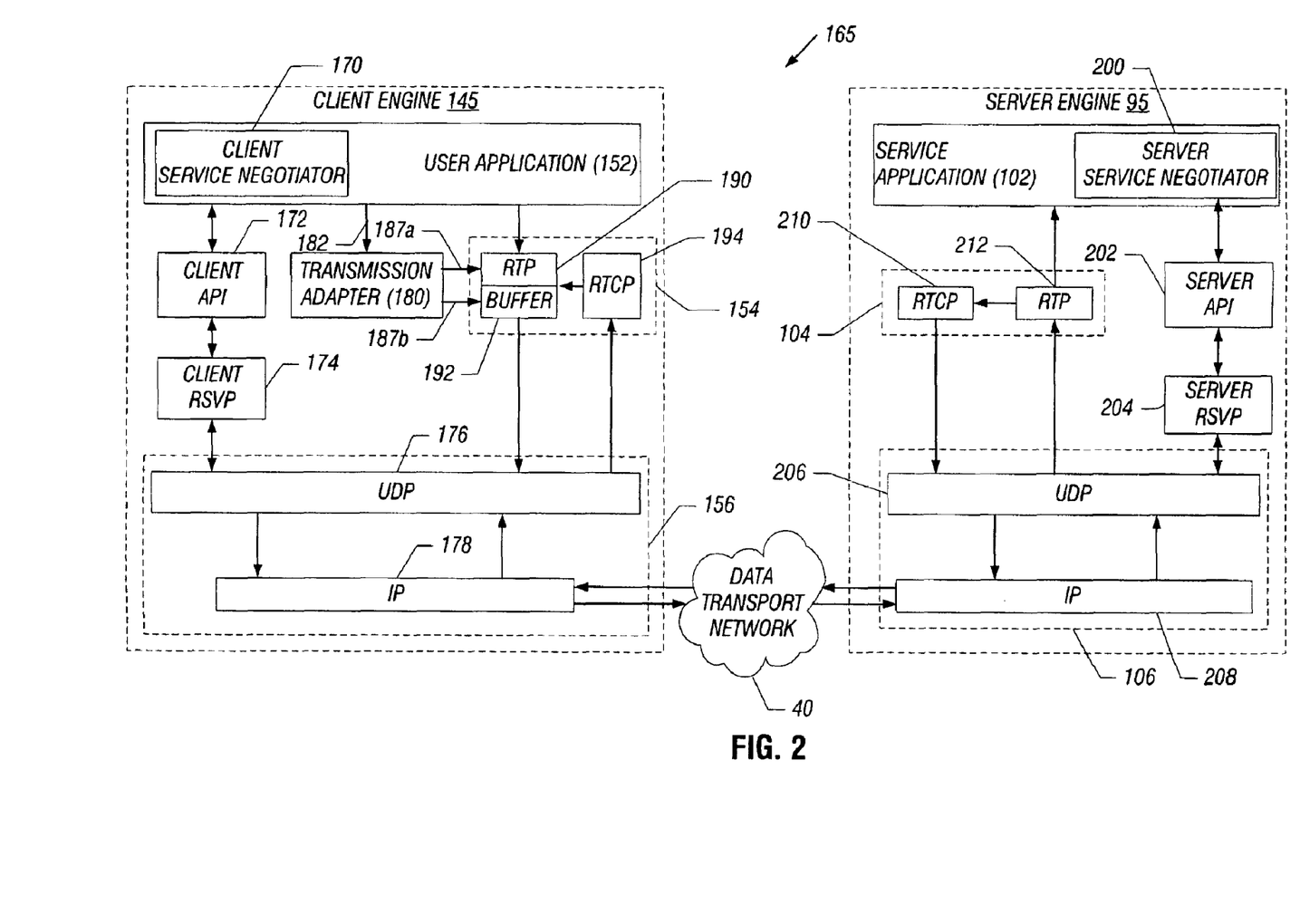
FIG. 2 is a schematic depiction of the communication system shown in FIG. 1 based on a client-server architecture according to one embodiment of the present invention.

Consistent with one embodiment of the present invention, an end-to-end transport architecture 165, as shown in FIG. 2 includes the client engine 145 that connects to the server engine 95 over the data transport network 40 (FIG. 1), ensuring a reliable service, which cannot be otherwise provided by an infrastructure negotiated quality of service (QoS). In one embodiment, the infrastructure negotiated QoS is a quality of service profile which may not meet the requirements of the user application 152.

By deploying the end-to-end transport architecture 165 for use with the data transport network 40 which may be a general packet radio service (GPRS) network, communication of data between the client engine 145 and server engine 95 may be adapted for a communication or service session in one embodiment of the present invention. Over the GPRS network, with a quality of service (QoS) support, a reliable and relatively faster end-to-end delivery service particularly for short flows of data may be provided by dynamically adapting transmission, such as a transmission rate, and/or provisioning an immediate retransmission of any incomplete transmission, in some embodiments.

To this end, the client engine 145 may comprise the user application 152 that includes a client service negotiator 170, enabling a user to subscribe to and subsequently use a service, such as a packet-based or packet-switched end-to-end delivery service. The client engine 145 may further include a client application programming interface (API) 172 which may allow the user application 152 to initiate a QoS negotiation for a communication or service session according to one embodiment of the present invention. A client resource reservation protocol (RSVP) module 174 may be responsible for this quality of service negotiation with intermediate nodes (e.g., routers) over the data transport network 40 and the server engine 95 and then set up the QoS based network resource reservation including the reserved bandwidth.

However, the QoS profiles 135 may be updated during the data transmission in some embodiments of the present invention. As described above with respect to FIG. 1, both the client engine 145 and the server engine 95 may utilize protocol stacks including RTP, UDP, IP protocols according to one embodiment of the present invention.

According to one operation of the present invention, the user application 152 may pass user data to the user RTP layer engine 154 and, in turn, to the user UDP/IP stack 156. The user RTP layer engine 154 may comprise a client-side real-time transport protocol (RTP) 190, a buffer 192 to store each outgoing and unacknowledged packet and a client-side real-time transport control protocol (RTCP) 194 which is a companion protocol to the real-time transport protocol 190. Likewise, the user UDP/IP stack 156 may include a user datagram protocol (UDP) 176 and an Internet protocol (IP) 178, providing a data delivery service for upper layers, such as for the user application 152.

Upon initialization, the client engine 145 may be loaded into a storage device, such as the memory 125. During packet transmission, the user application 152 may provide a control parameter signal 182 corresponding to one or more control parameters (e.g., including the currently negotiated QoS profile 135, the number of packets to be sent, and the predefined service reliability requirement parameter) to a transmission adapter 180, which may dynamically adjust one or more transmission parameters associated with a current communication or service session according to the current network conditions in the data transport network 40. In response to the control parameter signal 182, one or more transmission parameters, such as a retransmission times signal 187*a* and a sending rate signal 187*b* may be adjusted before being provided to the user RTP 190. That is, in response to the control parameter signal 182, the transmission adapter 180 may dynamically adjust at least one of the retransmission times signal 187*a* and the sending rate signal 187*b* for the communication or service session based on the current network conditions of the data transport network 40.

For the server engine 95, the provider application 102 may comprise a server service negotiator 200, negotiating a quality of service (QoS) profile in one embodiment of the present invention. In addition, a server application programming interface (API) 202 operably couples to a server RSVP module 204 to further interface with the provider UDP/IP stack 106. The server engine 95 may include the provider RTP layer engine 104 comprising a server-side real-time control protocol (RTCP) 210 and a server-side real-time transport portocol (RTP) 212. The provider UDP/IP stack 106 may additionally comprise a user datagram protocol (UDP) 206 and an Internet protocol (IP) 208 to enable communication over the data transport network 40, in some embodiments.

In operation, the transmission adapter 180 may dynamically adjust transmission parameters, such as a sending rate and transmission times, according to current available network resources and an application's service requirement. In this manner, the transmission adapter 180 may provide for a highly reliable data delivery service, meeting reliability requirements of some applications, such as in speech data transfer while making full use of the network resources.

Specifically, the user application 152 at the client engine 145 (data sender in FIG. 2) passes the user data to a transport protocol stack including the RTP 190 (the sequence number of the RTP packet is assigned uniquely), UDP 176 and IP 178. At the server engine 95, the user data is extracted and provided to the provider application 102 (data receiver in FIG. 2). Afterwards, the server engine 95 sends the RTCP feedback packets, specifying sequence numbers of acknowledged RTP packets to the client engine 145. Furthermore, the buffer 192 may store each outgoing packet at the client engine 145.

After all the packets are sent out to the server engine 95 and no new user data are produced at the client engine 145, the client engine 145 records the total number of the packets to be sent and sets the maximum number of times each packet can be retransmitted. Thereafter, the client engine 145 retransmits the stored packet that is not acknowledged by its corresponding RTCP packet until all the packets are acknowledged or the client engine 145 has used up all the retransmission opportunities. In the user data transmission, the client engine 145 may send packets at a bit rate that matches to the reserved bandwidth, making full use of the network resources reserved based on the currently negotiated QoS profile 135.

More specifically, the transmission adapter 180 may dynamically adjust the transmission parameters, such as the data sending rate (e.g., a bit rate) and the data transmission times according to the control parameters. A data sending rate may be a rate at which the client engine 145 transfers data packets and dynamically depend on current reserved bandwidth so as to fully utilize current available network resources. Data transmission times is the data packet retransmission opportunity that determines how many times a packet may be delivered to the receiver and is dynamically determined by a reliability class in the current QoS profile and a predefined reliability parameter. The control parameters are passed to the transmission adapter 180 by the user application 152. One function of the transmission adapter 180 is to ensure a highly reliable data delivery service that may meet the reliability requirement of the user application 152 and efficient utilization of network resources.

In one embodiment, n packets may be transmitted k times over a channel with a packet loss rate of p, then the loss rate of a single packet is $p^k$. According to probability theory, the probability for all the packets to be correctly received may be derived using equation (1) as set forth, in one embodiment.

$$R = 1 - \sum_{i=1}^{n} \binom{n}{i} (p^k)^i (1-p^k)^{n-1} \approx 1 - np^k \quad (1)$$

Then:

$$k \approx \log_p^{(1-R)} - \log_p^n$$

A client may retransmit packets k−1 times (k−1 retransmission opportunity) to satisfy a reliability requirement (R) if n packets are to be sent while the current network packet loss rate is p. Accordingly, delivery of short flows may be accomplished beyond a QoS that is guaranteed beforehand in some embodiments of the present invention.

First, the reserved bandwidth may be determined for transmission based on a quality of service profile in one embodiment. Before communicating the packets of data over a network at a rate that matches the reserved bandwidth, at least one transmission parameter may be adjusted for the transmission. An adjustment of a transmission parameter may include receiving a service requirement of an application and the quality of service profile negotiation for a data sender and a data receiver. For the application, a service session profile may be negotiated between the service subscriber unit 30 and the service provider 50. In this way, the service reliability requirement and other service parameters may be derived from the service session profile.

According to one packet delivery procedure consistent with one embodiment of the present invention, an exchange of packets of data including RTP and RTCP packets may take place between a sender and a receiver. For sending RTP data packets, the sender may count the total number of RTP data packets during each packet transportation session. After all the packets are sent out (whether or not correctly received) and no new user data is generated, the sender may get the total number of the packets to be delivered, and then set the retransmission times according to equation (1). Since each outgoing but unacknowledged packet is stored in a buffer, the sender may retransmit those RTP packets immediately until all of them are acknowledged or their retransmission opportunities are used up (the retransmission times decremented for each round of retransmission). However, the RTCP acknowledgement packets may arrive at the sender at any time, triggering the stored packets to be freed.

For sending a data packet, such as a RTP packet, the sender's behavior may include communicating each RTP packet and storing it in the buffer, counting the total number of the RTP packets to be delivered, setting the retransmission times according to equation (1), retransmitting the stored but unacknowledged RTP packets, decrementing retransmission times by one each time, freeing the stored RTP packets if they are acknowledged (it may happen at any time in the communication session), and checking if all of the RTP packets are acknowledged or their retransmission opportunities are used up. Likewise, the receiver's behavior for sending one or more acknowledgment RTCP packets involves receiving the RTP packets and sending corresponding RTCP acknowledgement packets to the sender.

Figure 3:
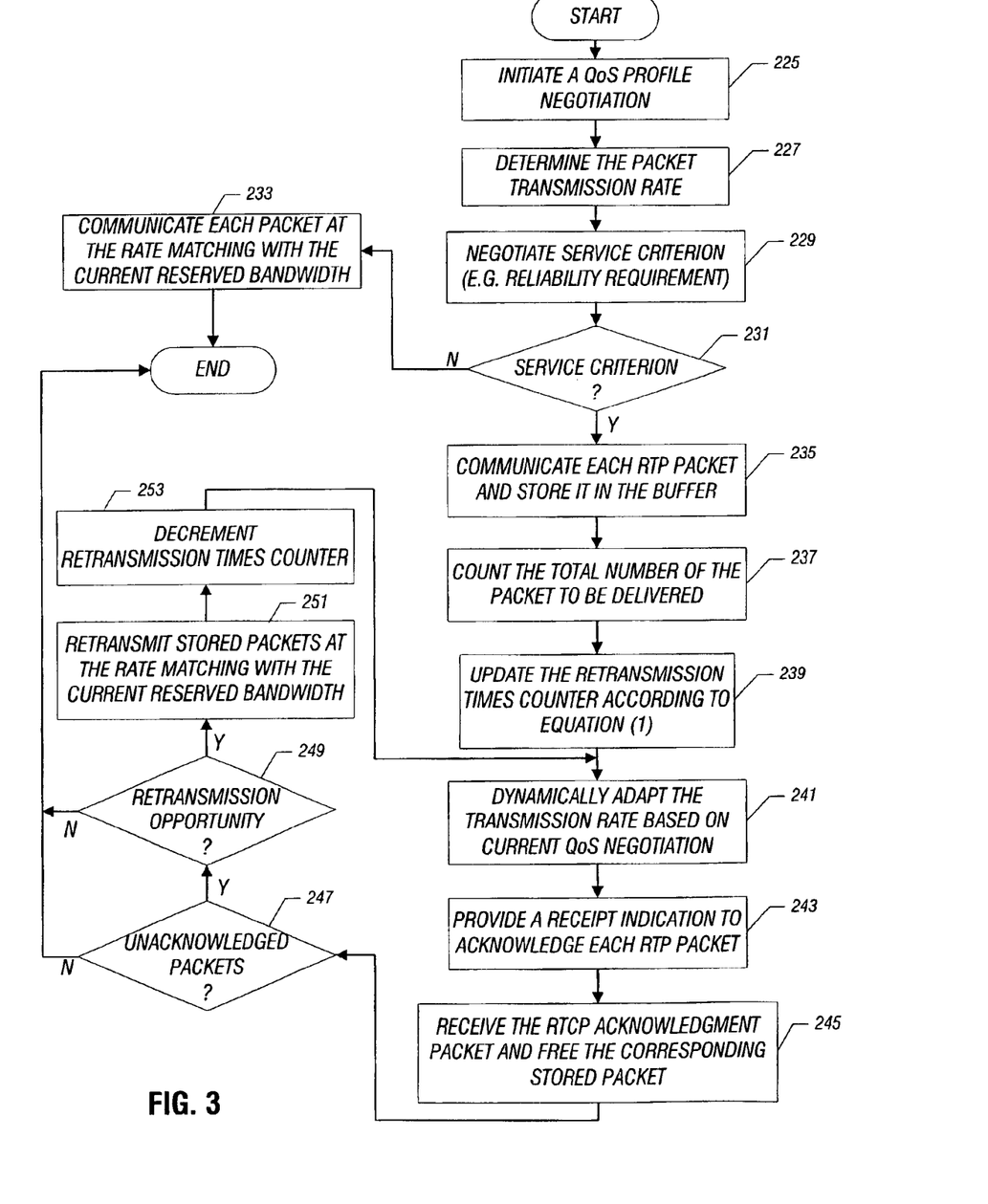
FIG. 3 is a flow chart showing a service session in accordance with one embodiment of the present invention.

According to one operation consistent with one embodiment of the present invention, at block 225, in FIG. 3 a user may initiate a QoS profile negotiation using RSVP and GPRS QoS signaling. Based on the QoS profile negotiation, the packet transmission rate may be determined at block 227. At block 229, a service criterion, such as a reliability requirement, may be negotiated for an application (i.e., the user application, over the data transport network 40 (FIG. 1) (e.g., a GPRS wireless network)) based on the service provisioned between a client and a server. Using the currently negotiated QoS profile 135, a current reserved bandwidth for transmission may be determined.

A check at diamond 231 may determine whether or not the service criterion (e.g., set forth by the user application 152) has to be met for the service. If no service criterion is to be fulfilled during the transmission, each packet of data may be communicated at the rate matching with the current reserved bandwidth at block 233, and the current communication or service session terminates. Conversely, if a particular service criterion indicating a certain reliability requirement of the user application 152 for the service, as an example, may desired to be fulfilled, then each RTP packet may be communicated and stored in a buffer at block 235. For the purposes of transmission, the packet transmission rate may be determined for packets of data such that the rate matches with the current reserved bandwidth of a current communication or a service session at block 233.

After all the RTP packets are communicated to the server engine 95 and no new user data are produced at the client engine 145, the client engine 145 counts the total number of the packets to be delivered, at block 237. Then the client engine 145 may update the retransmission times counter according to equation (1), in one embodiment, at block 239. In this way, the packet retransmission times may be updated according to the equation (1).

In order to meet the service criterion, the packet transmission rate of the packets of data may be dynamically adapted based on a currently negotiated QoS profile at block 241. Once the packets of data are transmitted over the data transport network 40, an RTCP receipt indication acknowledging a reception of each RTP packet of data may be provided to the server engine 95 at block 243 by the client engine 145. In one case, a RTCP acknowledgement packet each corresponding to a received RTP packet may indicate to the sender (e.g., the subscriber unit 30) of any unacknowledged packets of data at the receiver (i.e., in this case the service provider 50) within a particular communication or service session.

Thereafter, retransmission opportunities may be checked at diamond 249 in case some packets of data may be determined to be pending. When a next retransmission opportunity is detected to be available at the diamond 249, the stored and unacknowledged packets of the data may be retransmitted at the block 251 at the rate commensurate with the current reserved bandwidth. However, if all the packets of data are indicated to be reliably communicated, then the transmission of data for the current communication or service session terminates. That is, if all the packets are acknowledged or their transmission opportunities are exhausted, then the session terminates.

At the data sender, any unacknowledged packets of data may be identified based on the RTCP acknowledgement packet. At block 251, such stored but unacknowledged packets of data may be automatically and immediately retransmitted from the sender to the receiver if no new data are generated at the client, enabling the service to meet the service criterion, e.g., a reliability criteria satisfying a quality of service beyond one or all of the quality of service profiles 135 in some embodiments of the present invention. In this way, timely and reliable delivery of packets of data which cannot be otherwise provided by infrastructure negotiated QoS may be advantageously provided. Accordingly, a reliable service may be ensured for upper applications including the user application 152 and the provider application 102 shown in FIG. 2. At block 253, the retransmission times counter may be decremented.

Figure 4:
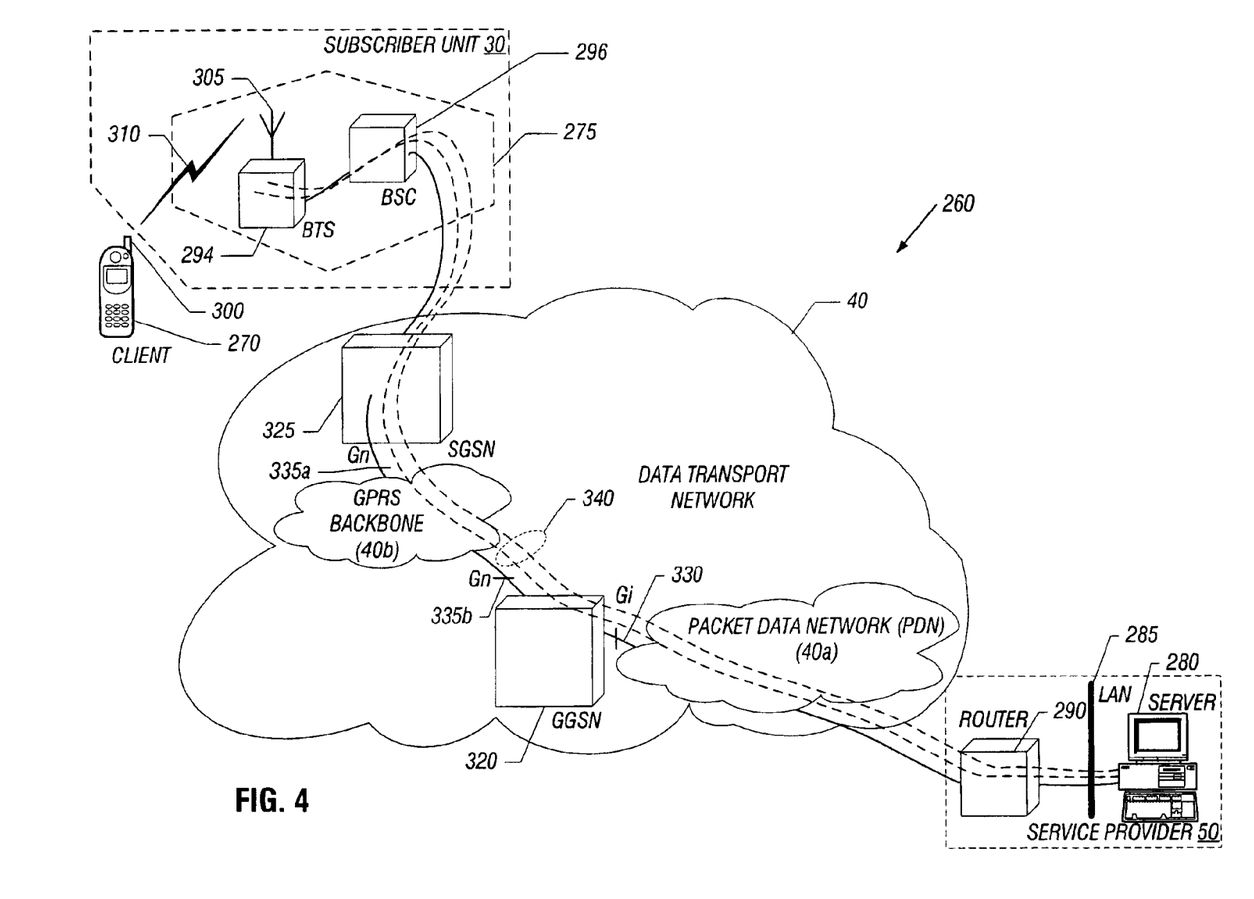
FIG. 4 is a schematic depiction of a general packet radio service network that supports cellular wireless data services according to one embodiment of the present invention.

A general packet radio service (GPRS) network 260, as shown in FIG. 4 enables a client 270 to communicate with a server 280, exchanging cellular data in one or more packets over a packet-based radio service in one embodiment. Examples of the client 270 include a mobile station, cellular phone, PDA, portable device, handsets and handheld wireless devices. The packet-based radio service may be adapted for an end-to-end delivery of a relatively short flows of packets of cellular data in one case. The server 280 may be associated with the service provider 50, connecting to a local area network (LAN) 285 that links to a router 290 for a network connection with the data transport network 40 (FIG. 1).

In a cell 275, forming a cellular network with other cells (not shown), a base transceiver station (BTS) 294 may be controlled by a base station controller (BSC) 296 while communicating to and from the client 270. Specifically, the client 270 may comprise an antenna 300 to wirelessly communicate with an antenna 305 connected to the BTS 294 for cellular wireless data services on a general packet radio service (GPRS) channel over an air interface 310 in one embodiment. An example of the antenna 300 is a dipole antenna.

To support the packet-based radio service, the data transport network 40 may incorporate a packet data network (PDN) 40a and a GPRS backbone 40b. While the PDN 40a may be the Internet and/or Intranet, the GPRS backbone 40b may be a public land mobile network (PLMN) for a global system for mobile communications (GSM) in some embodiments of the present invention. In particular, a gateway GPRS support node (GGSN) 320 may provide an interface between the GPRS backbone 40b and the PDN 40a. For the delivery of the packets of cellular data to and from the client 270, a serving GPRS support node (SGSN) 325 is responsible within a service area. An interface (Gi) 330 may connect the PDN 40a to the GGSN 320. Likewise, while one interface (Gn) 335a may connect the GPRS backbone 40b to the SGSN 325, the other interface (Gn) 335b may connect the GGSN 320 to the GPRS backbone 40b. A hypothetical routing path 340 is indicated to illustrate transmission of packets of cellular data within a service or communication session over a GPRS service, such as the packet-based radio service.

Quality of service (QoS) requirements (e.g., the negotiated QoS profiles 135 and service criterion requirements may be specified for a particular service over GPRS wireless network) for mobile packet data applications (e.g., user application 152 and provider application 102), governing the operation of the client 270 and the server 280. Examples of the QoS requirements include service precedence to indicate a service priority, reliability classes, mean or certain percentile delays, and throughput parameters to indicate peak or mean bit rates. Examples of the mobile packet data applications include real-time multimedia streaming, Web browsing, and e-mail.

For mobile users including the client 270, different one or more reliability requirements, such as quality of service (QoS) classes including reliability and delay classes may be specified in some embodiments depending upon service agreements. Using these QoS classes, QoS profiles may be negotiated between the mobile user, i.e., the client 270 and the GPRS network 260 for each service session, depending upon the QoS demand from the service provider 50 and current available network resources or conditions. This represents, an infrastructure negotiated QoS in one embodiment. As described above, by adapting one or more transmission parameters during transmission, a service requirement, which otherwise cannot be provided by this infrastructure negotiated QoS may be provided, especially in relatively shorter flows of packets of cellular data between the client 270 and server 280.

Figure 5:
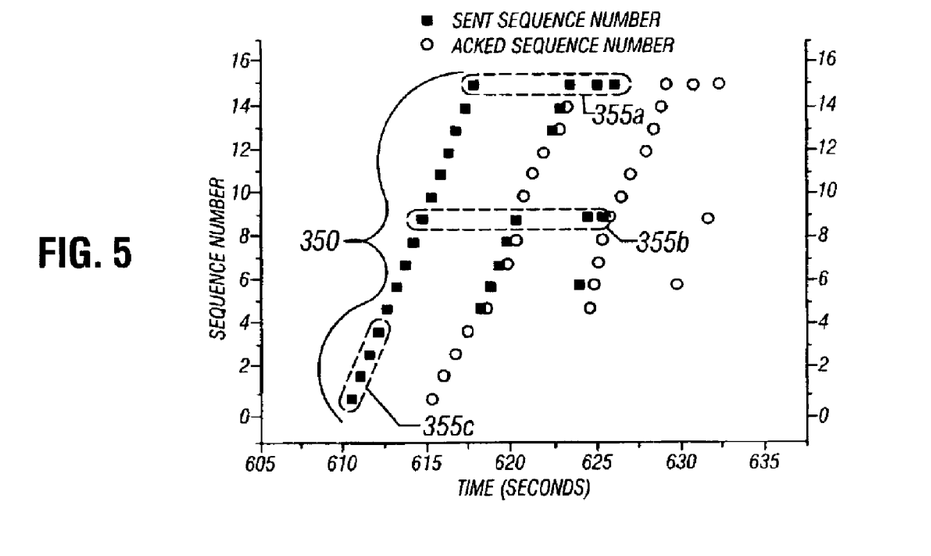
FIG. 5 is a hypothetical chart showing transmission metrics of cellular data transmission in the GPRS network of FIG. 4 in which a bit rate of transmission and total packet transmission times are determined by reserved bandwidth and a reliability class indicated in a currently negotiated quality of service profile and a predefined service reliability requirement according to one embodiment of the present invention.

A hypothetical chart showing transmission metrics of cellular data transmission in the GPRS network 260 of FIG. 4 is shown in FIG. 5 according to one embodiment of the present invention. A bit rate of transmission is adapted to match with reserved bandwidth derived from a quality of service profile. To show transmission of each packet a "sent sequence number" may be used, and to acknowledge each packet "an acknowledgement (ACKED) sequence number" may be used in reception indications. In the chart shown in FIG. 5, all fifteen packets 350 are received appropriately even after sending some packets four times 355a, 355b to meet a reliability requirement of a user or upper layer application, e.g., the user application 152 shown in FIG. 2. Four packets 355c may be sent only once as they may be acknowledged after a first transmission itself.

A TCP protocol stack is used widely in many wireless data applications, however, after an idle period, a TCP-based sender may enter into a slow-start period and initialize a current sending window size to two segments, introducing significant latency to the delivery of short transfers of data, leading to inefficient utilization of network resources. In case of short TCP transfers, the sending window size is often not large enough to make full use of bandwidth reserved. Furthermore, the TCP-based sender may not be able to distinguish the packet loss due to network congestion from the packet loss because of transmission error. Some TCP-based senders, triggered by a packet loss due to a transmission error falsely and frequently may reduce their data sending rate.

Unlike a TCP-based sender, a bit rate of data transmission may not be restricted by current congestion window in some embodiments of the present invention. Since the client 270 is aware of reserved bandwidth after QoS negotiation, it may send packets of cellular data at a bit rate that matches with reserved bandwidth during the data transmission, resulting in highly efficient network resource utilization and relatively less latency in some embodiments of the present invention. In some situations, a service requirement of application may be satisfied beyond the negotiated QoS because the gap between the application requirement and the negotiated QoS may be appropriately bridged.

Moreover, retransmission of acknowledged packets greatly improves the reliability, meeting one or more requirements (e.g., service criterion) of upper layer applications, i.e., user application 152. The retransmission mechanism may improve the reliability of data transmission, meeting the reliability requirement of upper applications over the GPRS network 260. In this way, a relatively faster and reliable transmission than most TCP-based transmission schemes having QoS support may be provided for a reliable data delivery service, efficiently utilizing network resources.

In one embodiment, the client 270 and server 280 may meet the one or more requirements in the presence of significant levels of non-congestion loss, a kind of phenomena very common in a s link due to the transmission error, which otherwise falsely triggers a TCP-based sender to slow-down the data sending rate. A fast-start mechanism may obviate much latency and inefficient utilization of network resources into the delivery of short transfers in one embodiment. The bit rate may be determined by the bandwidth reserved, instead of a congestion window size. Therefore, reserved bandwidth is fully used and the effect of transmission error on the performance is reduced in some cases.

In one embodiment, using resource reservation and currently negotiated quality of service profile for real-time services with a host of interconnect technologies for the data transport network 40 (FIG. 1), different forms of data may be routed between a variety of data computers or servers in application processing and enterprise computing environments. As an example, in a packet-based input/output communication a data packet, such as a unicast and/or a multicast packet may be routed. While the unicast packet is forwarded to a predefined destination port, the multicast packet is transmitted to more than one destination ports.

More specifically, the real-time transport protocol (RTP) may provide end-to-end network transport functions suitable for applications transmitting real-time data, such as audio, video or simulation data, over multicast or unicast network services. The data transport may be augmented by the real-time transport control protocol (RTCP) that allows monitoring of the data delivery. Because the RTP and RTCP may be devised to be independent of the underlying transport and network layers, use of RTP-level translators, and mixers may be supported as well. Additionally, the resource reservation protocol (RSVP) may enable an integrated services Internet. The RSVP may further provide a receiver-initiated setup of resource reservations for multicast or unicast data flows, which may be relatively short flows.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

determining a current reserved bandwidth and a transmission parameter for transmission based on a quality of service profile; and adjusting said transmission parameter for the transmission based on said quality of service profile to satisfy a reliability requirement before retransmitting one or more packets of data over a wireless network within the current reserved bandwidth.

2. The method of claim 1, adjusting said at least one transmission parameter including:

specifying the reliability requirement of an application;

initiating a negotiation of said quality of service profile for a data sender and a data receiver;

determining a rate of packet transmission based on the quality of service profile;

negotiating a service criterion for the application based on the reliability requirement;

updating for said service criterion packet retransmission times of said one or more packets of data between the data sender and the data receiver; and dynamically adapting the rate of packet transmission based on a currently negotiated said quality of service profile.

3. The method of claim 1, including:

activating a packet-switched bearer service for a data sender and a data receiver; and dynamically adapting said transmission parameter based on a currently negotiated said quality of service profile for the packet-switched bearer service.

4. The method of claim 1, including:

communicating said each of one or more packets of data; and storing said each of one or more packets of data.

5. The method of claim 4, including:

counting the total number of said one or more packets of data to be delivered;

updating retransmission times for said one or more packets of data; and retransmitting said one or more packets of data a number of times based on a number of packets to be sent and the current reserved bandwidth.

6. The method of claim 5, including:

acknowledging at a data sender a receipt indication from a data receiver for at least one of said one or more packets of data;

in response to the receipt indication, identifying at least one unacknowledged packet of said one or more packets of data; and automatically retransmitting from the data sender said at least one unacknowledged packet to the data receiver.

7. A method comprising:

initiating a quality of service profile negotiation for a mobile client capable of wirelessly sending and receiving data;

using the quality of service profile to determine reserved bandwidth for data transmission and a packet transmission rate; and in a communication session, dynamically adapting the packet transmission rate based on the quality of the service profile and data retransmission times based on the reserved bandwidth to meet a requirement of an application.

8. The method of claim 7, including:

defining one or more transmission parameters for the communication session over a wireless network that supports a packet-based end-to-end delivery service; and dynamically adjusting at least one of said one or more transmission parameters for the communication session based on the wireless network.

9. The method of claim 8, including:

using the packet-based end-to-end delivery service to communicate a relatively short flow of one or more packets of cellular data in a general packet radio service channel;

during the communication session, sending from the mobile client said one or more packets of cellular data to a server over the network at the rate that substantially matches the reserved bandwidth; and acknowledging at the mobile client a receipt indication associated with at least one of said one or more packets of cellular data.

10. The method of claim 9, including:

identifying at least one unacknowledged packet of said one or more packets of cellular data based on the receipt indication; and automatically retransmitting from the mobile client to the server said at least one unacknowledged packet a number of times that satisfies the requirement of the application.

11. An apparatus comprising:

a storage device to store an application program to determine a current reserved bandwidth and a transmission parameter for transmission based on a quality of service profile; and an adapter to adjust said transmission parameter for the transmission based on said quality of service profile to satisfy a reliability requirement of said application program before a retransmission of one or more packets of data over a wireless network within the current reserved bandwidth.

12. The apparatus of claim 11, wherein said storage device to further store a protocol engine to provide over the wireless network a packet-switched bearer service, wherein the wireless network to deliver said one or more packets of data between a source and a target end based on the current reserved bandwidth and the reliability requirement.

13. The apparatus of claim 12, said protocol engine comprising:

a transport protocol to provide the packet-switched bearer service in real-time over the network;

a companion transport protocol to provide a receipt feedback for said one or more packets of data;

a user datagram protocol to provide a message sending procedure for said application program while in communication over the wireless network with another application program; and an Internet protocol to support said transport, companion transport and user datagram protocols.

14. The apparatus of claim 13, wherein said application program to use said user datagram protocol to negotiate a service criterion with a service provider based on said quality of service profile.

15. The apparatus of claim 14, wherein said application program to dynamically adapt a rate of the transmission of said one or more packets of data based on a currently negotiated said quality of service and adjust packet retransmission times to retransmit stored and unacknowledged packets of data of said one or more packets of data based on the current reserved bandwidth.

16. A wireless communication device comprising:

an interface to communicate cellular data over a wireless network that supports a packet-based general packet radio service; and a storage device operably coupled to said interface to store a transport protocol engine to determine a current reserved bandwidth for transmission of said cellular data and a packet transmission rate based on a quality of service profile and adjust the packet transmission rate of said cellular data in a data communication session before a retransmission of said cellular data at a rate commensurate with the current reserved bandwidth and a reliability requirement in addition to said quality of service profile.

17. The wireless communication device of claim 16, said storage device further including:

an application program to negotiate a current quality of service with a service provider based on said quality of service profile and reliability requirement, to provide a control parameter indicative of the current quality of service; and an adapter module to receive the control parameter from said application program to adapt at least one transmission parameter that dynamically adjusts the packet transmission rate of said cellular data during the data communication session.

18. The wireless communication device of claim 17, wherein said transport protocol engine includes a user datagram protocol.

19. The wireless communication device of claim 18, wherein said general packet radio service meets a criterion satisfying the quality of service beyond said current quality of service profile.

20. The wireless communication device of claim 19, wherein said transport protocol engine to:

provide an end-to-end delivery for a relatively short flow of said cellular data in one or more packets to and from the service provider over the wireless network; and automatically receive one or more unacknowledged packets of the one or more packets of said cellular data from the service provider based on a packet receipt feedback indication.

21. An article comprising a medium storing instructions that, if executed, enable a processor-based system to:

determine for transmission a current reserved bandwidth and a transmission parameter based on a quality of service profile; and adjust said transmission parameter for the transmission based on said quality of service profile to satisfy a reliability requirement before retransmission of one or more packets of data over a wireless network within the current reserved bandwidth.

22. The article of claim 21, further comprising instructions that if executed, enable the system to:

specify the reliability requirement of an application;

initiate a negotiation of said quality of service profile for a data sender and a data receiver;

determine a rate of packet transmission based on the quality of service profile;

negotiate a service criterion for the application based on the reliability requirement;

update for said service criterion packet retransmission times of said one or more packets of data between the data sender and the data receiver; and dynamically adapt the rate of packet transmission based on currently negotiated said quality of service profile.

23. The article of claim 21, further comprising instructions that if executed, enable the system to:

activate a packet-switched bearer service for a data sender and a data receiver; and dynamically adapt said transmission parameter based on a currently negotiated said quality of service profile far the packet-switched bearer service.

24. The article of claim 21, further comprising instructions that if executed, enable the system to:

communicate said each of one or more packets of data; and store said each of one or more packets of data.

25. The article of claim 24, further comprising instructions that if executed. enable the system to:

count the total number of said one or more packets of data to be delivered;

update retransmission times for said one or more packets of data; and retransmit said one or more packets of data a number of times based on a number of packets to be sent and the current reserved bandwidth.

26. The article of claim 25, further comprising instructions that if executed, enable the system to:

acknowledge at the data sender a receipt indication from the data receiver for at least one of said one or more packets of data;

in response to the receipt indication, identify at least one unacknowledged packet of said one or more packets of data; and automatically retransmit from the data sender said at least one unacknowledged packet to the data receiver.

27. An article comprising a medium storing instructions that, if executed, enable a processor-based system to:

initiate a quality of service profile negotiation for a mobile client capable of wirelessly sending and receiving data;

use the quality of service profile to determine reserved bandwidth for data transmission and a packet transmission rate; and in a communication session, dynamically adapt the packet transmission rate based on the quality of the service profile and data retransmission times based on the reserved bandwidth to meet a requirement of an application.

28. The article of claim 27, further comprising instructions that if executed, enable the system to:

define one or more transmission parameters for the communication session over a wireless network that supports a packet-based end-to-end delivery service; and dynamically adjust at least one of said one or more transmission parameters for the communication session based on the wireless network.

29. The article of claim 28, further comprising instructions that if executed, enable the system to:

use the packet-based end-to-end delivery service to communicate a relatively short flow of one or more packets of cellular data in a general packet radio service channel;

during the communication session, send from the mobile client said one or more packets of cellular data to a server over the network at the rate that substantially matches the reserved bandwidth; and acknowledge at the mobile client a receipt indication associated with at least one of said one or more packets of cellular data.

30. The article of claim 29, further comprising instructions that if executed, enable the system to:

identify at least one unacknowledged packet of said one or more packets of cellular data based on the receipt indication; and automatically retransmit from the mobile client to the server said at least one unacknowledged packet a number of times that satisfies the requirement of the application.

* * * * *